July 21, 1970  H. RUCHLIS  3,521,380
ELECTRON SHELL MODEL
Filed Jan. 8, 1968
FIG. 1
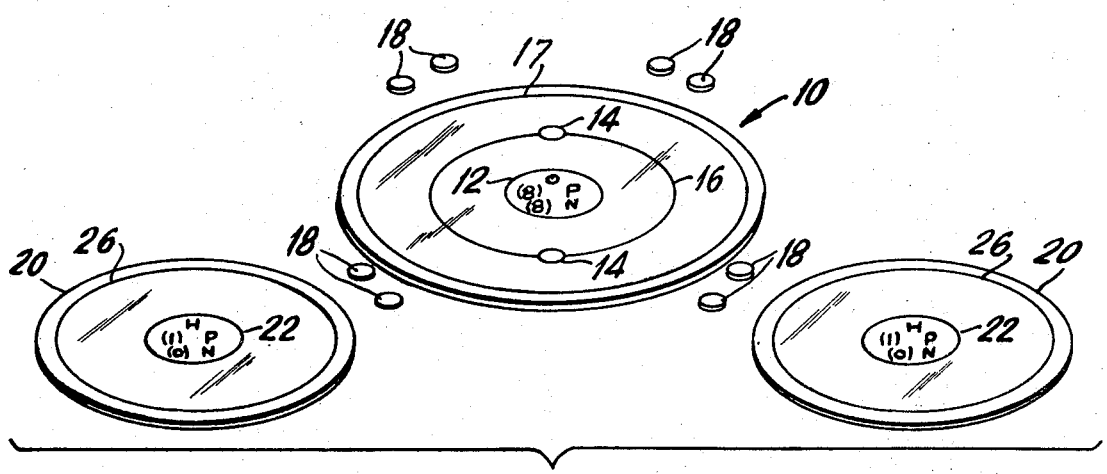
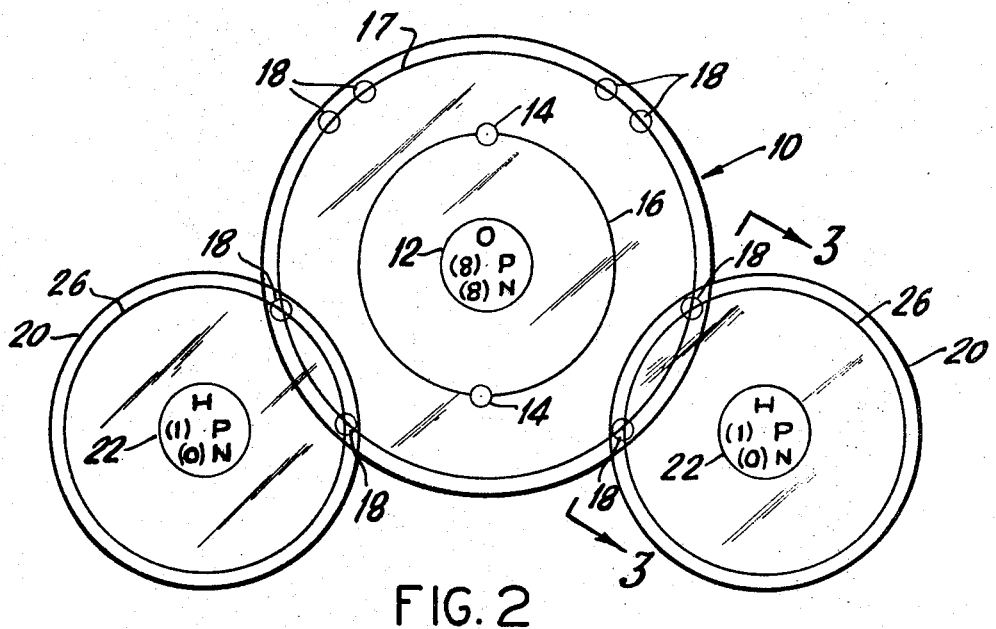
FIG. 2
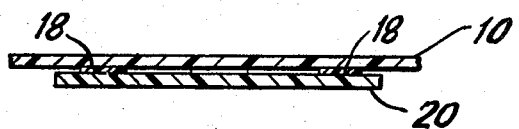
FIG. 3
INVENTOR.
*HYMAN RUCHLIS*
BY
*Kenyon & Kenyon*
ATTORNEYS

United States Patent Office

3,521,380
Patented July 21, 1970

1

3,521,380
ELECTRON SHELL MODEL
Hyman Ruchlis, Brooklyn, N.Y., assignor to Harcourt, Brace & World, Inc., New York, N.Y., a corporation of New York
Filed Jan. 8, 1968, Ser. No. 696,292
Int. Cl. G09b 23/26
U.S. Cl. 35—18                                3 Claims

ABSTRACT OF THE DISCLOSURE

The embodiment disclosed in the following specification is an educational device directed to facilitating the teaching of molecular theory. Structurally, it includes a plurality of smooth independent transparent discs which are designed to represent atoms of each of the elements. Each disc has printed thereon a centrally disposed circle with nomenclature printed therein indicating the composition of the nucleus. In addition, the discs have circles printed concentrically with the nucleus which represent the electron shells. Those circles that represent completed inner electron shells have small solid circular representations printed thereon which serve to indicate the presence and number of electrons occupying the shell. The outer electron shell is illustrated as a circle without any electrons, regardless of the valence of the atom. A plurality of flexible vinyl tabs, or similar material which adheres temporarily upon contact, are provided for placement on the outer electron shell circle to represent the outer shell electrons. Their addition completes the model. In addition, these vinyl tabs provide adhesion between discs when the discs are arranged in a proper relationship to illustrate a molecule. The discs are adapted to be arranged in overlapping relationship with the vinyl tabs therebetween in intimate contact with each disc and on the circles representing the outer electron shell of each atom.

BACKGROUND OF INVENTION

Field of the invention

This invention relates generally to teaching devices and more particularly to a simple inexpensive and effective device for illustrating some of the basic principles of currently accepted molecular theory.

Prior art

Presently, there are teaching devices in the form of models directed to the problem of teaching elementary, junior high school, and high school pupils the accepted theory of molecular structure. The current state of the art includes models having rigidly fixed pegs projecting from the model which represent electrons of the outer shell. Therefore, since the pins which serve to illustrate each electron in the outer shell are permanently attached to each mode, the design suggests that each electron remains associated primarily with the atom of which it was a part prior to the formation of the molecule. This suggestion is contrary to present day molecular theory which teaches that the electrons of the outer shell of each atom are shared when molecules are formed; i.e., the electrons of the outer shell of each atom can become common to several atoms of the molecule. Moreover, the pins of the prior art devices which simulate electrons in the outer shell must necessarily differ in appearance from the representations which illustrate the inner shell electrons. This is also inconsistent with the accepted present-day molecular theory and will confuse the observer of the model.

In addition, the prior art devices are large, cumbersome to handle and relatively expensive. Accordingly, it is impractical and expensive to use more than one in the classroom. Typically, the one classroom model is used by the teacher to instruct by demonstration, hence the teaching is solely didactic in character. The obvious disadvantage of this method is its failure to afford an opportunity for participation by the students. Consequently, the likelihood of retaining the interest of all but the more studious students diminishes. The interest of the student is more likely to be aroused by giving each student a model which he can examine and manipulate.

Objects of the invention

It is therefore an overall object of this invention to provide an educational device for effectively teaching the basic principles of molecular theory to elementary, junior high school and high school students.

It is a further object of this invention to provide a teaching device of simple design, wherein atoms which in nature combine to form molecules can be illustrated in uncomplicated and readily understandable form to the elementary and secondary student.

Another object of the invention is to provide a simple and inexpensive teaching device which will enable schools to provide each student studying molecular theory with models that illustrate molecular theory graphically and which can be manipulated and examined.

A still further object of the invention is to provide a model which simulates atoms of the elements shown on the periodic chart and which represents the electrons of each electron shell identically regardless of whether the electron shell be one of the inner electron shells or the outer electron shells.

Yet a further object of the invention is to provide a teaching device wherein molecular theory can be demonstrated by combining discs simulating atoms of the elements which, in nature, form a molecule in a manner wherein it is impossible to tell with which atom the electrons of the outer shell were associated prior to the formation of the molecule.

A still further object of the invention is to provide a model formed of several discs, each representing an atom, which when properly combined to form a model of a molecule can be picked up and examined and moved about by the student without falling apart.

SUMMARY OF THE INVENTION

These and other objects of the invention are achieved by a simple design for a teaching device comprised of smooth transparent discs and vinyl tabs. A circle printed at the center of each disc represents the nucleus of the atom with a blank space upon which the student may indicate (with grease pencil or other markings) the number of protons and neutrons that constitute the nucleus of the particular atom. Each disc also has printed thereon, concentrically with the circle representing the nucleus, additional circles representing each electron shell of the atom. The inner printed circles represent the inner electron shells and have small solid printed circular marks arranged thereon to represent the electrons in each inner shell. The outer shell of each disc, regardless of the element represented lacks any markings to indicate the presence of electrons. The electrons in the outer shell of each element are represented by the vinyl tabs which can be made to adhere to the disc at points on the circle representing the outer electron shell by the simple expedient of applying pressure between the tab and the disc. Functionally, the models illustrate molecular formation when a student arranges discs (which represent atoms of elements that can combine in nature to form a molecule) in overlying relationship with the electron-simulating vinyl tabs therebetween.

Transparent discs are important since this enables the student to see through the discs to the vinyl tabs, printed orbit shells and printed electrons underneath.

DESCRIPTION OF THE DRAWINGS

A better appreciation of the invention can be had from the following detailed specification taken in conjunction with the attached drawings in which:

FIG. 1 is an exploded perspective view of a combination of discs and vinyl tabs;

FIG. 2 is a plan view of the components of the model shown in FIG. 1 arranged to assume the configuration of a water molecule; and FIG. 3 is a sectional view along the plane 3—3 of FIG. 2.

DESCRIPTION OF THE PREFERRED EMBODIMENT

In order to better illustrate the invention, one example of the demonstration model will be described. This particular embodiment of the invention consists of two transparent discs 20 which represent hydrogen atoms, a transparent disc 10 which represents an oxygen atom and vinyl tabs 18 which represent the outer shell electrons of both atoms. As best seen in FIG. 1, each disc 20 representing the hydrogen atom has printed thereon a centrally disposed circle 22 which represents the atom nucleus. The symbol H is printed on the transparent discs 20 within the centrally disposed circle 22 to indicate that the disc represents a hydrogen atom. Also printed in the centrally disposed circle 22 is the nomenclature (1)P indicating one proton, and (0)N indicating the absence of neutrons thereby defining the structure of the hydrogen nucleus. Disc 20 also has printed thereon a circle 26, concentric with the centrally disposed circle 22, to represent the electron shell of the hydrogen atom. There is no printing of this circle 26 to indicate or represent the electron normally associated with the electron shell being represented by the circle 26.

The disc 10 representing the oxygen atom has a centrally disposed printed circle 12 with the symbol O printed therein to indicate that the disc represents an oxygen atom. The centrally disposed circle 12 also has printed therein the nomenclature (8)P, indicating the presence of eight protons, and (8)N, indicating the presence of eight neutrons thereby defining the structure of the oxygen nucleus.

In addition, a circle 16, representing the inner electron shell of the oxygen atom, is printed on disc 10 concentrically with the inner circle 12. Two small solid circular marks 14, representing the two inner shell electrons, are printed on line 16 in such manner that line 16 passes through the center of each solid circular mark 14.

The oxygen disc 10 has a third circle 17 printed thereon which is concentric with circles 12 and 16 but larger. Circle 17 represents the outer electron shell, there is no printed indication of the six electrons normally associated with this electron shell.

Vinyl tabs 18 are employed to represent the electrons of the outer shell and can be arranged on the respective atom models 10 and 20 to show the number of electrons the atom carries in its outer shell when it is in its atomic form. For example, the oxygen atom would carry six electrons in its outer shell. Therefore six vinyl tabs 18 would be placed on the outer circle 17 to depict an oxygen atom. Similarly, the hydrogen atom would require the placement of one vinyl tab 18 on the outer shell circle 26 to depict the hydrogen atom in its atomic form. The vinyl tabs 18 are sized and shaped to give the same appearance as the solid circular marks 14 which represent the inner shell electrons.

With these components, the student can arrange the discs 10 and 20, representing hydrogen and oxygen atoms, along with the vinyl tabs 18 which represent outer shell electrons, in a proper orientation to illustrate a molecule of water.

As shown in FIG. 2, this is done by placing six vinyl tabs 18 on what will be characterized as the top face of the oxygen atom 10 at points along the circle 17. This completes the oxygen atom. One vinyl tab 18 is placed on the circle 26 of each hydrogen atom disc 20. Next, the student takes the two discs 20, representing hydrogen atoms, and places them underlapping the disc 10, in such a fashion that the upper face of the hydrogen atom disc 20 lies against the bottom face of the oxygen atom 10. The student then takes the vinyl tabs 18 representing the electrons in the shell 26 of the hydrogen atom and moves them between the disc 10 and 20 at the intersection of the electron shell representation lines 17 and 26. The student also takes two of the six outer shell electrons representing tabs 18 in the oxygen atom disc 10 and places these tabs between the discs 10 and 20 at the intersection of the outer electron shell lines 17 and 26. The student should then end up with something resembling the arrangement shown in FIG. 2.

The student will note that he has no way of uniquely determining or representing which of the electron representing tabs 18 at the intersection of the lines 17 and 26 derive from the hydrogen disc 20 and which from the oxygen disc 10. Thus he can be made to more readily recognize the nature of the outer shell electron sharing that current theory asserts takes place when atoms combine to form a molecule.

As can also be readily appreciated, this technique is an aid to teaching the valence theory and the relationship of the valence to the forming of molecular models.

As may best be seen in FIG. 3, the oxygen disc and hydrogen dics 20 are not in intimate contact with each other but each of these discs 10 and 20 are in intimate contact with certain of the vinyl tabs 18 that are between the discs. The student should be taught to exert pressure between the assembled discs 10 and 20 so as to take advantage of the adhesive properties of a smooth vinyl tab when placed against another smooth surface. In order to obtain the desired adhesion between the vinyl tabs 18 and the discs 10 and 20, it is important that the faces of the discs 10 and 20 be flat and smooth. A transparent disc made out of a plastic material has been found to work satisfactorily. A plastic material is preferable to glass because of its low weight which aids in preventing separation of the formed molecule when the molecule is picked up by the student.

The model, therefore, suggests that it is the electrons, as represented by the vinyl tabs 18, which hold the atoms of each molecule in the proper molecular orientations. Hence, the student can intuitively grasp two of the basic principles of accepted molecular theory; first, that electrons of the outer shell of the atoms which comprise a molecular are "shared," and second, that a charge exists in the electrons which facilitate holding the atoms of a molecule in the proper arrangement. In addition, the student can take the device apart and put it back together. Also, any varient of disc combinations can be used to build molecule models. As an added benefit, when the full complement of discs are available, they may be arranged to illustrate the elements as they appear on the Mendeleeff Periodic Table. A display of this sort has the benefit over the typical printed Periodic Tables in that it graphically illustrates the progressively larger size which each element on the table takes as its atomic number is increased. Furthermore, it illustrates graphically the valence of each element. In particular, the inherent design of the discs shows the change in size of an atom when each additional electron shell is added.

While this invention has been described in connection with certain specific embodiments thereof, it is to be understood that this has been done merely for purposes of illustration.

For example, it has been found preferable to manufacture the tabs 18, which represent outer shell electrons, out of polyvinyl chloride having sufficient plasticizers to provide a flexible tab 18. These tabs 18 are preferably press polished so as to provide a very smooth surface and increasing their adhering characteristic. The transparent atom discs 10, 20 can be made from any material with a smooth surface. Glass provides excellent adhering qualities with the vinyl tabs 18 but because of weight and the risk of its breaking when handled by small children, it is preferable to employ some smooth transparent plastic material. It would be obvious to vary the materials employed from the preferred materials mentioned particularly as the costs of the various materials available change over a period of time.

Accordingly, it should be understood that the following claims encompass these and other variations of the invention which might be effected by those skilled in the relevant art.

The abstract of the disclosure is included in the specification merely to serve as a search tool and is not meant to limit the invention in any way.

What is claimed is:

1. An educational device for demonstrating the molecular theory of bonding by electron sharing and the fact that a major portion of an atom is unoccupied comprising:
    a plurality of substantially circular transparent discs, each having at least one flat surface, each of said discs representing an atom of an element and each having indicia thereon representing electron shells including an indicia of the outer electron shell of whatever atom is being represented by any one of said discs and each of the discs being of a size which corresponds to the number of electron shells the atom it represents has; and
    a plurality of vinyl tabs to represent outer shell electrons and adapted to be arranged to adhere to a surface of said discs at positions defined by said indicia of said outer electron shell;
    whereby two or more of said discs may be placed in overlapping relationship with the appropriate number of vinyl tabs therebetween to represent a molecule composed of the atoms represented by their respective discs so that the molecular theory of bonding by electron sharing and the substantial emptiness of the atoms which comprise the molecule can be readily seen.

2. The educational device of claim 1 wherein each of said discs has a smooth surface adapted to adhere to said vinyl tabs as said tabs are placed on said disc when pressure is applied between aid tabs and said discs.

3. The educational device of claim 2 wherein each of said discs includes two surfaces which are smooth and are adapted to adhere to said vinyl tabs as said tabs are placed on said surfaces when pressure is applied between said tabs and said discs.

References Cited
UNITED STATES PATENTS

| | | | |
|---|---|---|---|
| 2,961,779 | 11/1960 | Perry | 35—18 X |
| 2,477,179 | 7/1949 | Hart | 35—18 |
| 2,492,563 | 12/1949 | Flickenger. | |
| 2,586,039 | 2/1952 | Heggedal. | |
| 3,091,041 | 5/1963 | Marolles | 35—18 |
| 3,365,815 | 1/1968 | McCue | 35—18 |

HARLAND S. SKOGQUIST, Primary Examiner

U.S. Cl. X.R.

40—125

PO-1050
(5/69)

UNITED STATES PATENT OFFICE
CERTIFICATE OF CORRECTION

Patent No. 3,521,380　　　　　　　Dated July 21, 1970

Inventor(s) Hyman Ruchlis

It is certified that error appears in the above-identified patent and that said Letters Patent are hereby corrected as shown below:

Column 1, line 57, "mode" should be -- model --

Column 4, line 12, "the disc" should be -- discs --

Column 4, line 34, "certain of" should be -- certain --

Column 4, line 53, "molecular" should be -- molecule --

Column 6, line 15, "aid" should be -- said --

SIGNED AND
SEALED
DEC 22 1970

(SEAL)
Attest:

Edward M. Fletcher, Jr.
Attesting Officer

WILLIAM E. SCHUYLER, JR.
Commissioner of Patents